July 22, 1941.  W. S. ROGERS  2,249,855
ACTIVATION OF SOLE ATTACHING CEMENT
Filed Dec. 22, 1939
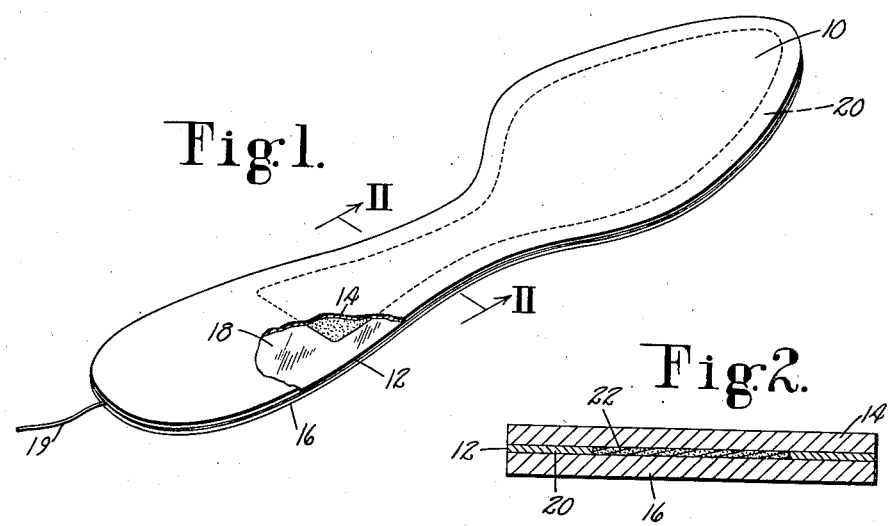
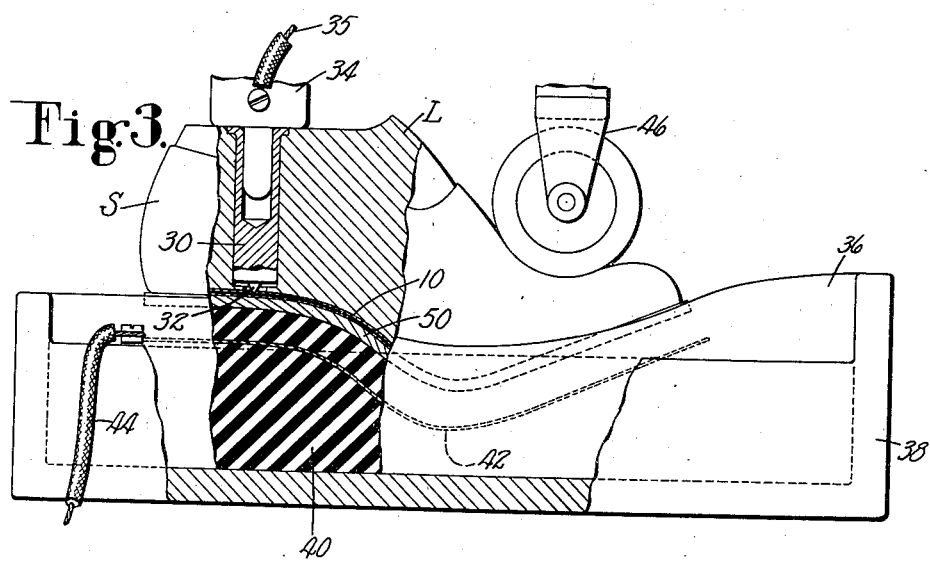
INVENTOR
Walter S. Rogers
By his Attorney
Victor Cobb Patented July 22, 1941

2,249,855

UNITED STATES PATENT OFFICE 2,249,855

ACTIVATION OF SOLE ATTACHING CEMENT

Walter S. Rogers, Falmouth, Mass., assignor to United Shoe Machinery Corporation, Borough of Flemington, N. J., a corporation of New Jersey Application December 22, 1939, Serial No. 310,601

3 Claims. (Cl. 12—142)

This invention relates to the activation, by means of an electrostatic field, of an adhesive employed for attaching an outsole to a shoe.

It being well understood that heat may be produced even in dielectric materials when they are inserted in a high frequency electrostatic field, it has been suggested that this manner of producing heat may be employed for the activation of a sole-attaching cement of the thermoplastic type. Such cements may be of various forms, including thermoplastic cements of the vinyl resin type, and usually are applied both to the margin of the outsole on the attaching face thereof and to the overlasted margin of the shoe upper, and allowed to dry and become hard and non-tacky. It is characteristic of cements of this type that they may be activated by the application of heat and that they do not require the use of a solvent which could not be driven off at once after the soles have been applied to the shoes but which would need a substantial period of time for their dispersion. With the thermoplastic cements, on the other hand, hardening of the cements and permanent attachment of the soles follow very quickly after the removal of the applied heat.

If an electrostatic field is to be employed for activating the cement, it will usually be found preferable to apply it to the one or more layers of cement after the sole and the shoe have been brought into contact in the desired position of attachment, and even after a substantial pressure has been applied to hold them in contact over all the various portions of the sole. The problem then arises of providing suitable electrodes between which an electrostatic field may be set up to apply the heat where it is desired, economically and quickly. For this purpose, there has been suggested the employment of plates, one of which is mounted on the pad of the sole-attaching press so as thereby to lie beneath a sole resting on that pad and the other of which is attached to or embodied in the last upon which the shoe is made. While this is theoretically a very desirable arrangement in that it positions the field so that it can pass directly through the cement as desired, it necessitates either the rebuilding of the lasts commonly employed in a shoe factory or the substitution of new lasts in which electrode plates are embodied. This change, involving as it would many thousands of lasts in each factory where the method is to be employed, renders the method unattractive to shoe manufacturers, both because of the trouble and because of the expense involved.

Accordingly, an object of the invention is to provide an improved method by which an electrostatic field may be economically and quickly used for the activation of sole-attaching cement.

In the attainment of this object and in accordance with an important feature of the invention, my method is carried out with the assistance of a composite insole which is embodied in the shoe and which is of such a character that it may constitute one of the electrodes for the electrostatic field. This insole in its illustrated form comprises a plate of thin sheet metal inserted between layers of leather or leather substitute and adapted to serve as one of the electrodes.

In carrying out the method, the composite insole is connected to one side of an oscillator to aid in setting up an electrostatic field for activating sole-attachment cement, thereby to secure a sole to the shoe.

The invention will be understood by consideration of the following description taken in connection with the accompanying drawing, in which Fig. 1 is an angular view of a composite insole, including a metallic sheet, part of the upper layer being broken away to expose the sheet;

Fig. 2 is a transverse section through this insole on the line II—II of Fig. 1, and Fig. 3 is a side elevation, partly in section, through a shoe embodying such an insole and positioned on a sole resting on the pad of a sole-attaching machine.

As herein illustrated, an insole 10 adapted to be embodied in a shoe S comprises a metallic plate 12 positioned between an upper layer 14 and a lower layer 16 of insole material. Such a plate may be of very thin metal, and even of the class of metal known as foil. It is here shown as having a heel portion 18 which will be used principally for connecting the same to one side of an oscillator (not shown). This portion rearwardly of the heel breast line will not be needed for the activation of cement because, in accordance with ordinary practice, the sole will not be attached by cement at points to the rear of the heel breast line. Forwardly of the heel breast line, the plate is shown as comprising a marginal band 20 which extends around the whole of the forepart of the insole. It could equally well be a solid plate (not shown) so far as effectiveness is concerned. The space within this marginal band 20 is shown as containing a filler 22 to avoid any variation in thickness between the different portions of the insole.

Whether this will be necessary in practice depends upon the thickness of the metal plate 12. A lead 19 attached to the plate 12 may be employed, which will be broken off after the last has been removed from the shoe. Alternatively, the last thimble 30 may be provided with a point 32 which will puncture the upper layer 14 of the insole and make an electric contact with the heel portion 18 of the insole plate. It then becomes possible to attach a lead 35 to a spindle 34 by means of which the shoe is positioned above the sole-attaching pad 36. This pad is shown diagrammatically as embodying a rigid box 38 in which there is a resilient pad member 40 having embedded in it another electrode plate 42 shaped approximately like the outline of a sole 50 which is to be attached to the shoe. This electrode 42 is provided with a lead 44 for attachment to one side of a high frequency oscillator (not shown) by means of which an electrostatic field is set up.

In using the apparatus, a sole 50 may be first positioned upon the pad 36 after which the shoe S, embodying the insole 10 and mounted on its last L, is rested upon the sole. It will be understood that in accordance with the usual practice both the sole margin and the margin of the overlasted upper of the shoe will have been provided with a coating of suitable thermoplastic cement which has been allowed to harden. Variations in this procedure are recognized, inasmuch as it may not always be found necessary to provide two coatings of cement and since it may not always be desired to allow the cement to harden fully before the shoe and sole are brought together. Contact is made (as shown in Fig. 3) with the electrode 12 through the thimble 30 and the spindle 34, this spindle also serving as an abutment, along with another abutment 46, to enable the shoe and sole to be brought into firm contact by means of relative movement between the pad 36 and the members 34 and 46. Upon the closing of the circuit leading to the oscillator, a high frequency field will be set up which will activate the cement layers lying between the electrode plate 12 and the electrode plate 42. This application of current will be for a very short period of time, such as a few seconds, and upon the disconnection of the oscillator the work will cool very promptly, allowing the cement to harden and attach the sole to the shoe.

Having described my invention, what I claim as new and desire to secure by Letters Patent of the United States is:

1. That improvement in methods of attaching soles to shoes which comprises activating thermoplastic cement positioned between the outsole and shoe bottom by a high frequency electrostatic field produced between a condenser plate forming a permanent part of the insole of the shoe and a plate located externally of the shoe.

2. That improvement in methods of cement-attaching soles to shoes which comprises heating sole-attaching cement, located between the outsole and the shoe bottom, while the shoe and outsole are under pressure, by means of a high frequency electrostatic field produced between condenser electrodes one of which forms a permanent part of the shoe bottom, while the other is located externally of the shoe.

3. A method of making shoes which consists in lasting an upper over an insole which has a layer of sheet metal in its forepart, providing an electrical connection to said sheet metal extending outside of the lasted shoe, applying cement to the overlasted margin of the upper, presenting to said shoe a previously cemented sole, positioning said shoe and sole in an electrostatic field provided between the insole electrode and another electrode outside of the shoe, thereby to activate the cement to attach the sole to the shoe, and applying pressure to force the sole into firm contact with the shoe.

WALTER S. ROGERS.